T. H. LAWRENCE.
NUT LOCK.
APPLICATION FILED OCT. 3, 1908.
916,171.  Patented Mar. 23, 1909.
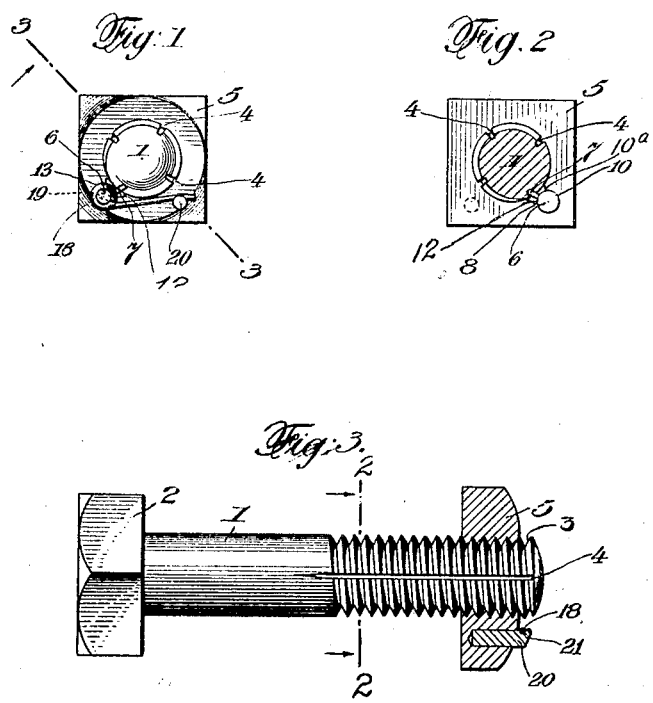

UNITED STATES PATENT OFFICE.

THOMAS H. LAWRENCE, OF NEW YORK, N. Y.

NUT-LOCK.

No. 916,171.  Specification of Letters Patent.  Patented March 23, 1909.

Application filed October 3, 1908. Serial No. 455,971.

*To all whom it may concern:*

Be it known that I, THOMAS H. LAWRENCE, of New York, in the county of New York, and in the State of New York, have invented a certain new and useful Improvement in Nut-Locks, and do hereby declare that the following is a full, clear, and exact description thereof.

My invention relates to an improvement in nut locks.

The nut lock which constitutes an embodiment of my invention is capable of application to various uses. It may be applied to railway rails upon the bolts that are used to attach the fish-plates to the rail ends. Among other uses that might be mentioned, it is also capable of efficient use in automobiles. Its construction is such that it can be applied with very great advantage to any structure which is subject to excessive vibration, as it is a well-known fact that in such structures there is a continual tendency for the nuts located upon the same not provided with any locking feature or attachment to gradually work loose to the detriment of the entire structure.

I have shown one embodiment of my invention in the accompanying drawings in which:—

Figure 1 is an end view of one of my nut locks applied to a bolt; Fig. 2 is an inner view of the same nut lock as applied to a bolt taken on line 2—2 of Fig. 3; and Fig. 3 is a side view of the same showing the nut lock in section taken on line 3—3 of Fig. 1.

In the drawings 1 is a bolt having a head 2 on one end and a screw-thread 3 at the other end. The bolt contains one or more longitudinal grooves 4 extending along the screw-threaded portion thereof. A nut 5, of the usual type, is designed to be received by the screw-thread 3. The nut 5 carries adjacent the screw-threaded portion thereof a longitudinal recess or groove 8, which comprises a cylindrical portion 10 connecting at one side with the screw-threaded opening in the nut by a radially directed wall 10ª, and at the other side by an angular recess 12. The cylindrical recess 10 is designed to carry a pintle 6 having a spline 7 attached thereto, which is designed to extend into one of the grooves 4. The pintle 6 is extended beyond the outer face of the nut, where it carries a spring 18 coiled around it and having one end passed through an opening 19 therein. The spring 18 has its other end extended across the outer face of the nut, the extreme end being retained by a notch 21 in a pin 20, projecting from the said outer face.

The operation of the device is as follows:—The spring 18 continually presses the spline 7 inwardly toward the screw-thread of the bolt. As the nut is tightened the spline 7 passes over the grooves 4 until the nut has become entirely tightened. The completion of the tightening of the nut is effected at some point where the spline 7 is in registry with one of the grooves 4. When an attempt is made now to unscrew the nut 5, the same cannot be accomplished as the spline 7 abuts against the radial wall 10ª and is, as a result, prevented from rotation in the direction which would permit the untightening of the nut. If it should be found desirable to unscrew or remove the nut, this could be accomplished by releasing the end of the spring 18 which is carried in the groove 21 upon the pin 20, and then using the longitudinal extension of the spring as a lever to rotate the spline 7, so as to remove it from the groove 4 in which it is carried. When so removed, the spline 7 is withdrawn into the angular recess 12, where it no longer intersects the path of movement of the screw-threaded end of the bolt. The bolt can now be unscrewed and removed in the usual manner.

While I have described my invention above in detail, I wish it to be understood that many changes might be made in the same without departing from the spirit thereof.

I claim:—

1. In a device of the character described, a screw-threaded bolt having a longitudinal groove upon the screw-threaded portion thereof, a nut screw-threaded upon the bolt, a pintle situated in the nut and having a spline adapted to register with the groove, said spline having a straight edge and being of sufficient depth to extend beneath the screw-thread of the bolt, and a spring attached at one end to the end of the pintle and at the other to the face of the nut, said spring serving normally to automatically force the spline into the groove when the nut is being tightened and when released from engagement with the face of the nut serving as a lever for the release of the spline from the groove.

2. In a device of the character described, a screw-threaded bolt having a longitudinal groove upon the screw-threaded portion thereof, a nut screw-threaded upon the bolt, a spline member adapted to register with the groove, said spline member being of sufficient depth to extend beneath the screw-thread of the bolt, and a spring connected at one end to the spline member and at the other end to the face of the nut, said spring serving normally to automatically force the spline member into the groove when the nut is being tightened, and when released from engagement with the face of the nut serving as a lever for the release of the spline member from the groove.

In testimony that I claim the foregoing I have hereunto set my hand.

THOMAS H. LAWRENCE.

Witnesses:
A. NEWCOMB,
M. MEIKLE.